United States Patent [19]

Aubert

[11] 4,087,886
[45] May 9, 1978

[54] AUTOMATIC EVISCERATION PROCESS FOR ANIMAL CARCASSES

[75] Inventor: Georges Aubert, La Chapelle de Guinchay, France

[73] Assignee: Agence Nationale de Valorisation de la Recherche (ANVAR), Neuilly sur Seine, France

[21] Appl. No.: 692,662

[22] Filed: Jun. 4, 1976

[30] Foreign Application Priority Data

Jun. 10, 1975 France .............................. 75 18025

[51] Int. Cl.² .............................................. A22B 5/00
[52] U.S. Cl. .......................................... 17/52; 17/23; 17/54
[58] Field of Search .................... 17/52, 45, 54, 11, 23

[56] References Cited

U.S. PATENT DOCUMENTS

| | | | |
|---|---|---|---|
| 3,811,152 | 5/1974 | Herubel | 17/52 X |
| 3,921,255 | 11/1975 | La Barber | 17/11 |
| 3,958,302 | 5/1976 | Meyn | 17/11 |
| 3,958,303 | 5/1976 | Scheier et al. | 17/11 X |
| 3,988,803 | 11/1976 | Hamark | 17/23 |
| 3,995,350 | 12/1976 | Ekstam | 17/23 |
| 4,023,237 | 5/1977 | Meyn | 17/52 X |

*Primary Examiner*—David H. Brown
*Attorney, Agent, or Firm*—Brisebois & Kruger

[57] ABSTRACT

The present invention relates to a process for eviscerating animal carcasses. A carcass, carried by a conveyor chain, is sensed by a positioning mechanism. A cutting tool is placed and actuated to open the body cavity, permitting access to the viscera. As the carcass is moved along by the conveyor chain, it is pivoted, and the viscera drop into a divided receiving hopper by stages.

3 Claims, 7 Drawing Figures

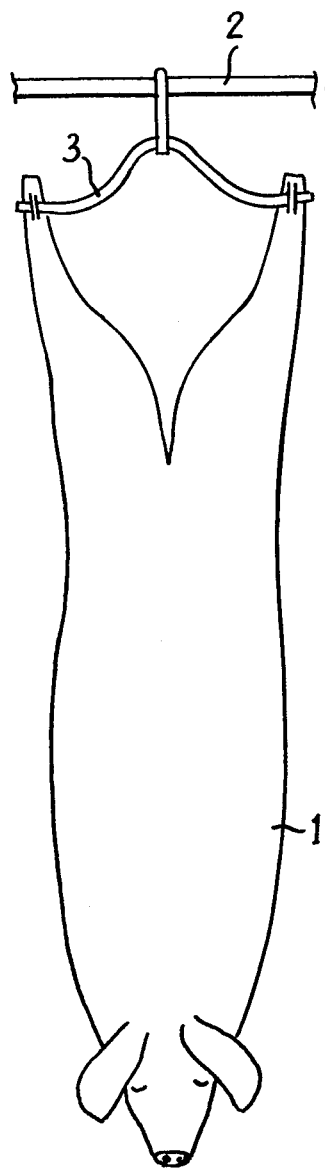
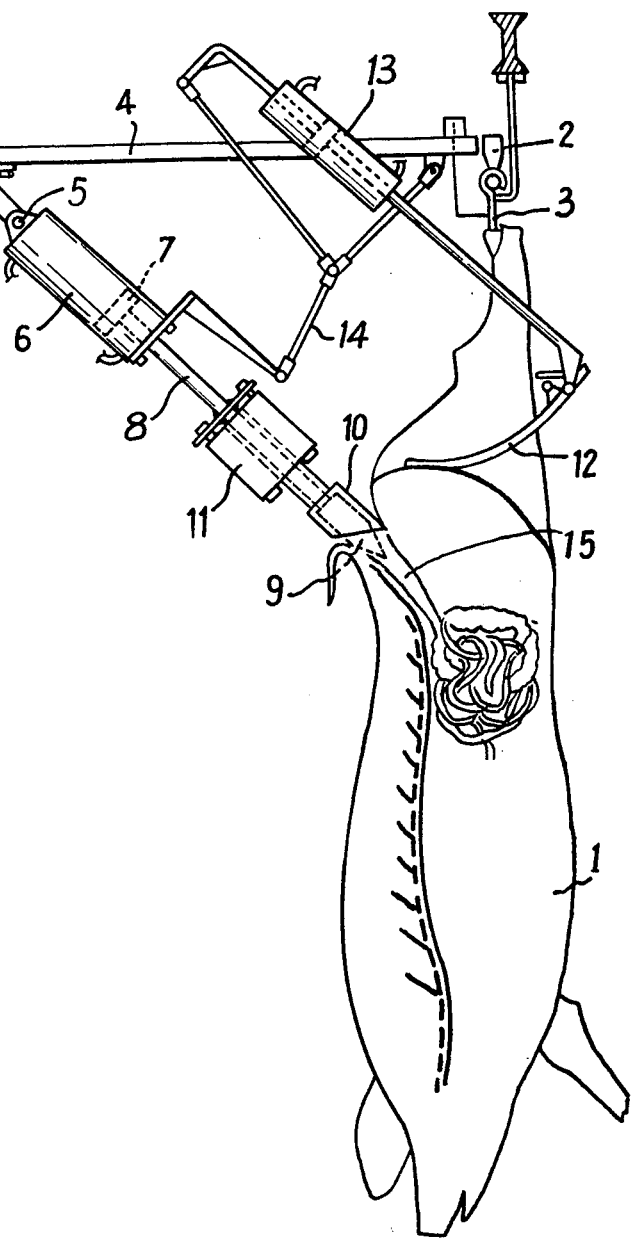

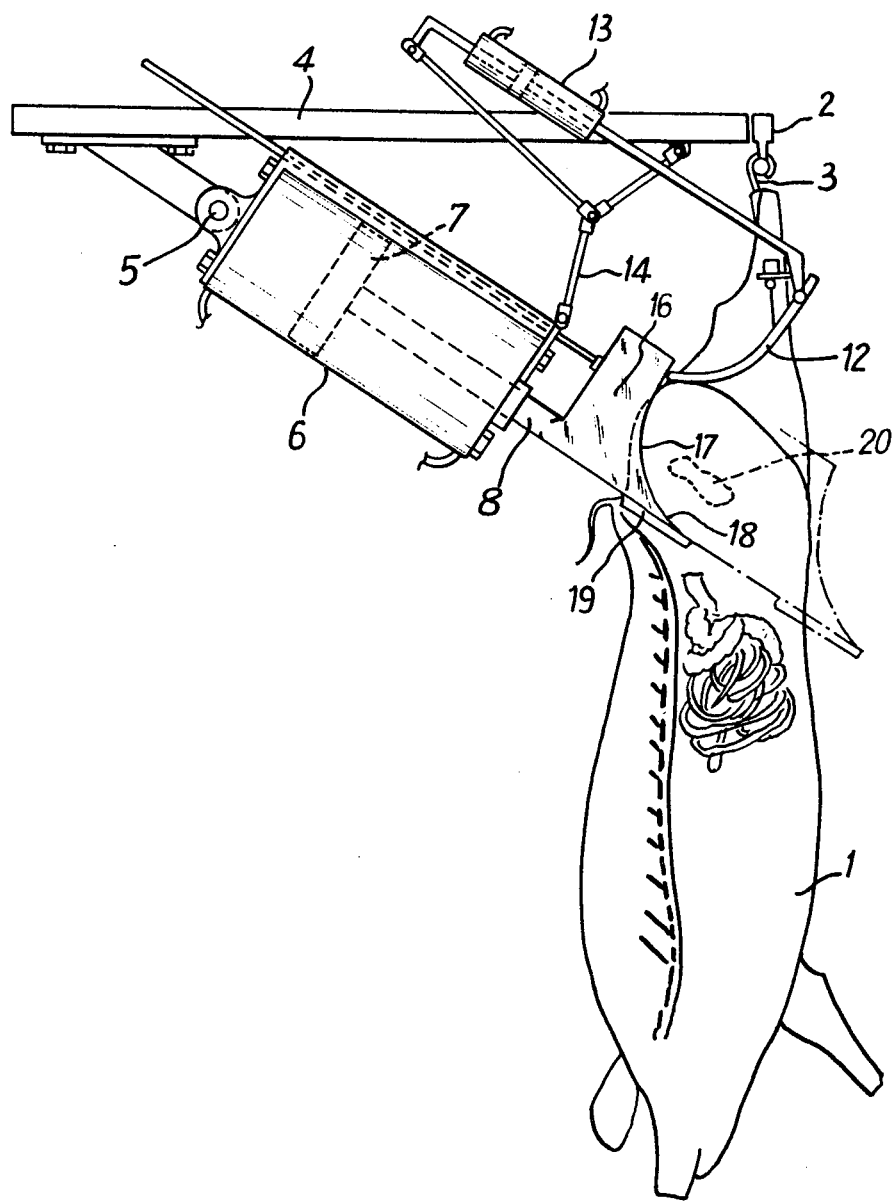

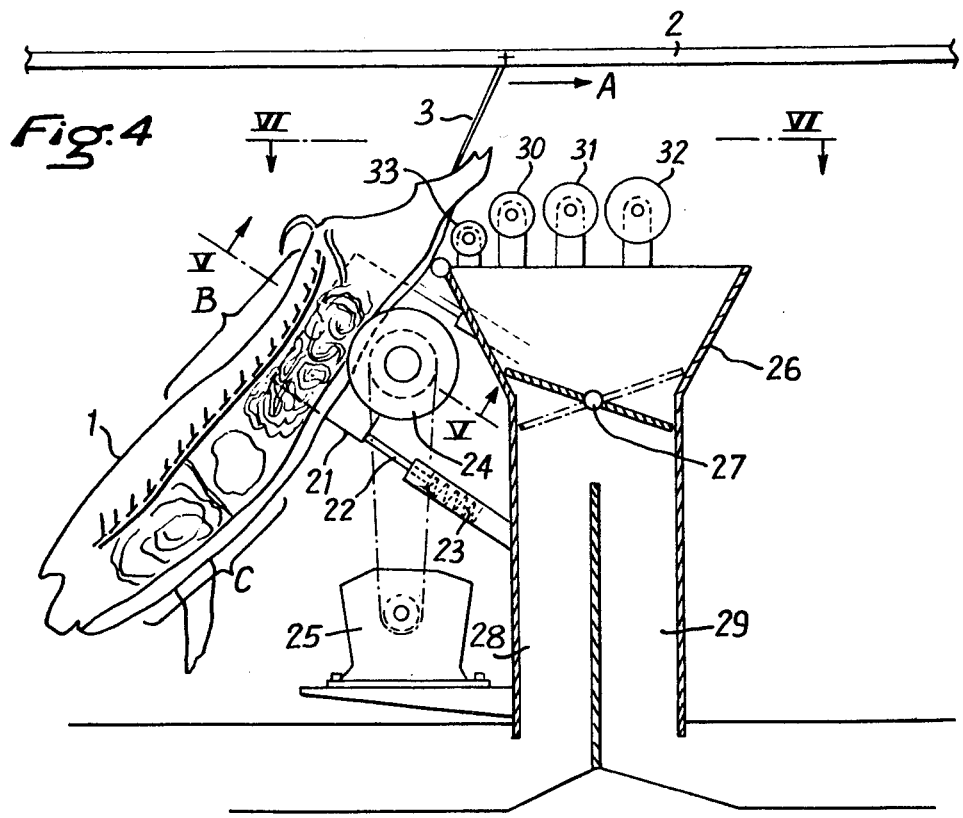
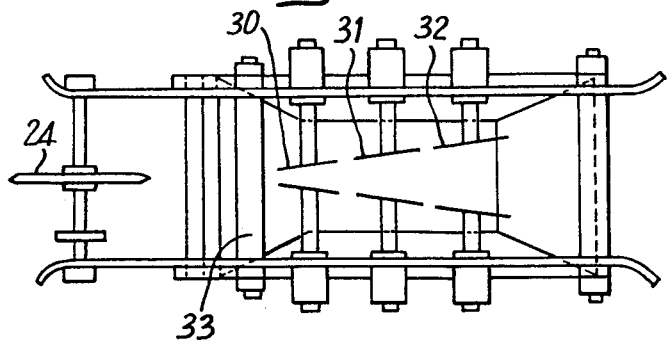
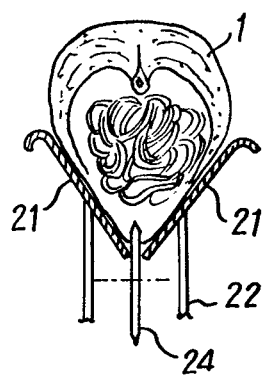
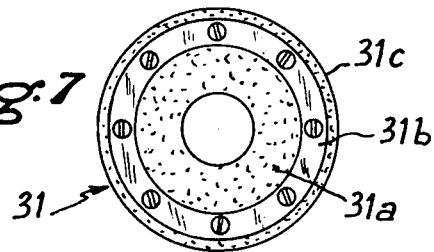

AUTOMATIC EVISCERATION PROCESS FOR ANIMAL CARCASSES

SUMMARY OF THE INVENTION

The present invention relates to an automatic evisceration process for human-consumption animal carcasses to be used in high-rate industrial slaughterhouses.

The eviscerating operation in current practice requires a series of stages, namely manually opening, by means of a cutting tool, the ventral side of the carcass, then removing manually the various viscera. Considering the rapid rate prevalent in modern slaughterhouses (300 animals an hour and more), the eviscerating operation requires personnel in fairly large numbers who must work most of the time under difficult circumstances.

The present invention is intended to provide a process allowing automatic evisceration of the human-consumption animal carcasses in perfect sanitary conditions and without requiring the use of personnel, furthermore being suitable to the high operational rates of modern slaughterhouses.

The object of the present invention is an automatic evisceration process for human-consumption carcasses which are suspended from a conveyor belt and continuously moved along it, characterized by the following stages: a rotary cutting tool is placed in relation to the animal's anus, said tool is made to rotate for a pre-determined length of time, and to penetrate by a pre-determined length the animal's anus, a longitudinal cutting device is positioned in relation to the anus of the animal, said device is made to penetrate by a pre-determined length the animal's anus—being so designed as to section the coxal bone of the animal without perforating its intestines or bladder, said device is withdrawn, the carcass hanging from the conveyor belt is rotated by about 90°, the carcass is so guided that it will be tilted and its ventral side will be brought onto a cutting means, the carcass then being brought to face successive cutting segments to open it progressively so as to free and successively evacuate separately the abdominal and then the thoracic viscera.

In a preferred embodiment of the process of the invention, the carcasses hang by their back feet, the spacing between said feet being kept constant. Further, and advantageously, the carcass is brought to said cutting segments in an essentially horizontal position, the viscera thus being removed by gravity.

The term carcasses of human-consumption animals includes the carcasses of any animal meant for such consumption, particularly but not exclusively beef and hogs.

Another object of the present invention as a novel industrial product is equipment for implementing the automatic evisceration process described above, said equipment being characterized by the following components and systems mounted on a support moving in synchronism with the advance of said carcasses on the conveyor chain: a rotary cutting tool, a motor for rotating said tool, means for positioning said tool with respect to the animal's anus and connected to a sensor touching the animal, and a means for advancing by a predetermined length said cutting tool around the anus of the animal and for withdrawing it by the same length.

In a particular embodiment of the invention, said means for advancing the cutting tool and for withdrawing it comprises a jack hinged by one of its ends to said moving support, the piston being displaceable between two predetermined positions and the piston rod being mechanically ganged to one end of said rotary cutting tool. Advantageously the motor is mounted on the piston rod of said jack between the rod and said cutting tool.

The sensor advantageously may be connected to said jack by a positioning and connecting mechanism comprising in particular a second jack, preferably with dual action.

The rotary cutting tool may advantageously consist of a hollow cylindrical blade of bevel design.

The moving support furthermore must comprise a disengaging mechanism allowing moving the support synchronously with the carcass advance along the conveyor chain, then bringing the support back to the rear along said conveyor chain to load the next carcass.

Another object of the present invention is a novel industrial product in the form of equipment for implementing the automatic evisceration process of carcasses described above, said equipment being characterized by the use of the following components and systems mounted on a support moving in synchronism with the advance of said carcasses along the conveyor chain; a longitudinal sectioning device, a means for positioning said device with respect to the animal's anus, said means being connected to a sensor touching the animal, a means for advancing by a predetermined length said sectioning device into the animal's anus and for withdrawing it by the same length.

In a preferred embodiment, said means for advancing the sectioning device and for withdrawing it comprises a jack hinged by one of its ends to said moving support, the piston of which may move between two predetermined positions and the piston rod of which is solidly and rigidly connected to said sectioning device.

Advantageously the sensor is connected to said jack by a positioning and connecting mechanism comprising in particular a second jack, preferably with double action.

In a particularly advantageous embodiment of the invention, the sectioning device is an essentially plane blade with a curved front side ending in a point underneath which is located an elastic lining, particularly of rubber. This sectioning device is meant to cut the coxal bone of the animal, the elastic lining eliminating contact between the cutting part and the intestines and bladder of the animal so as not to perforate these latter.

Another object of the invention as a novel industrial product is equipment for implementing the automatic evisceration of animal carcasses for human consumption described above, said equipment being characterized by sloping guidance elements for bringing a carcass in the inclined position to a sectioning means and thereupon in an essentially horizontal position to successive cutting segments mounted on the upper part of a hopper receiving the viscera, said hopper comprising two distinct compartments, one for receiving the thoracic viscera and the other for the abdominal ones.

The sectioning means preferably is a rotary metal disk so mounted as to achieve the opening of the ventral side of the carcass while the carcass is kept in position by inclined guidance elements.

These guidance elements comprise for instance two inclined skids mounted telescopically and defining between them a slit through which passes the rotating disk.

The cutting disks mounted at the upper part of the viscera-receiving hopper advantageously comprise a plurality of pairs of disks with diameters increasing in the advancing direction of the carcasses, the first of these disks being metallic and the ensuing ones made of plastic and comprising a cutting metal crown some slight distance from their circumferences. A variation provides for such disks to be cutting metal, and comprising a crown made of a deformable material, larger in diameter than the metal disk and fastened to its circumference.

Furthermore, the disks of each of said pairs of disks are symmetrically mounted with respect to the axis of the carcass, the spacing between the disks of said pairs increasing as the carcass advances.

Advantageously the hopper may comprise a door swinging between two positions to allow selective access of the viscera to said compartments. Other advantages and characteristics of the present invention will now be described, purely by way of illustration and example, with reference to the accompanying drawings, on which:

FIG. 1 shows diagrammatically the position of a carcass to be eviscerated by using the process of the invention;

FIG. 2 is a diagrammatic elevation of an embodiment using the process of the invention;

FIG. 3 is a schematic elevation of another embodiment using the process of the invention;

FIG. 4 is a schematic elevation of another embodiment using the invention, the inclined guidance elements for the carcass having been partly removed for greater clarity;

FIG. 5 is a schematic section along V—V of FIG. 4;

FIG. 6 is a schematic view along VI—VI of FIG. 4, showing a top view of the embodiment of FIG. 4, the carcass having been removed for greater clarity; and FIG. 7 is a disk which may be utilized in the embodiment of FIG. 4. FIG. 1 shows a carcass 1 hanging from a conveyor chain rail 2 by means of a hook 3 known in the trade as a butcher's gambrel and provided with branches of the same length of which the ends support the rear feet of the animal in order to hang the animal in such manner that its lengthwise axis always will be vertical with respect to the suspension point of hook 3 on the rail of conveyor chain 2.

It is understood of course that, even though the drawing shows the carcass to be that of a hog, the invention is in no way limited to that animal and applies to all animals fit for human consumption, particularly to hooved animals.

The embodiment shown in FIG. 2 comprises a moving support 4 which moves in synchronism with the advance of carcass 1 hanging from rail 2 by means of hook 3. Means (not shown in the drawings) are provided to bring the moving support 4 back along the conveyor chain by disengaging it from the carcass advance mechanism.

A jack 6, of which piston 7 responds to a predetermined stroke, is hinged at 5 on support 4. Piston rod 8 is solidly and rigidly connected to a guidance spit 9 for penetrating the animal's anus. A rotating knife 10 for engaging around the anus and in the shape of a bevelled hollow blade is mounted around said spit. A motor 11 is mounted between rotary knife 10 and jack 6. The rotor shaft of motor 11 is solidly and rigidly connected to knife 10 and is hollow to allow passage of the stem of spit 9. This embodiment of the invention furthermore comprises a sensor 12 to touch the animal's carcass between its rear feet, said sensor being mounted at the end of a double-effect jack rod 13 of which the other end of the rod is connected by a mechanical linkage system 14 to jack 6.

The equipment shown in FIG. 2 operates as follows:

Carcass 1 continuously moving on the conveyor chain carried by rail 2 is sensed by detectors (not shown in the drawing) and which actuate jack 13 bringing sensor 12 into contact with the carcass 1 between its rear feet. The position of sensor 12 through the action of jack 13 and of linkage system 14 determines the slope of jack 6 pivoting about its hinge 5 with respect to moving support 4. Guidance spit 9 is positioned in this manner opposite anus 15 of the animal. Motor 11 is activated for a predetermined time and makes knife 10 rotate. Simultaneously piston 7 of jack 6 is advanced by a predetermined length to make knife 10 penetrate around the animal's anus and to section a circular opening of a definite diameter around the animal's anus. Once this opening has been sectioned, motor 11 stops and piston 7 returns to the rear, bringing knife 10 outside the animal's anus. All of the equipment carried by support 4 and so far moving synchronously with the carcass now returns to the starting point ready to operate on the next carcass.

Another embodiment is shown in FIG. 3, for implementing the process of the invention, wherein the same reference numerals denote the parts identical with those in FIG. 2.

Regarding this embodiment, rod 8 of jack 6 is solidly and rigidly connected by its end to a sectioning blade 16 with a curved front side 17 ending in a point 18 underneath which is placed a flexible lining 19, for instance of rubber. Blade 16 is meant to cut the animal's coxal bone diagrammatically shown at 20, lining 18 thus avoiding damage to the intestines and to the bladder of the animal during the advance of the blade caused by piston 7 of jack 6.

The embodiment of FIG. 3 operates as follows:

After carcass 1 has been sectioned at the anus as illustrated on FIG. 2, it is sensed as described in relation to said FIG. 2 by sensor 12 touching the carcass 1 and determining thereby the position of jack 6 is the axis of the opening made in the animal's anus. Piston 7 of jack 6 is then advanced by a predetermined stroke so as to ensure the corresponding advance of blade 16 which, through its cutting edge 17, ensures the lengthwise sectioning of the animal, in particular the sectioning of the coxal bone without damage to intestines or bladder, this sectioning taking place between the position shown in solid lines in FIG. 3 and the position shown in broken lines.

Blade 16 is then withdrawn from the animal's body by means of the return of piston 7.

The following description refers to FIGS. 4 through 7.

After the carcass has passed through the mechanism shown in FIGS. 2 and 3, it is pivoted by 90° while remaining suspended through hook 3 to rail 2, and while continuing to move in the direction of arrow A in FIG. 4. It is engaged by an inclined guidance system comprising two inclined skids 21 mounted on telescoping arms 22 which in turn rest on calibrated compression springs 23. A cutting disk 24 rotating through the mechanical drive 25 is mounted in the slit between skids 21.

It is to be understood in relation to FIG. 4 that when the carcass advances in the direction of arrow A, it is subjected to longitudinal sectioning in its ventral side through being pressed against cutting blade 24, springs 23 adjusting to the weight of the animal, the position of skids 21 thereby ensuring a given cutting depth in such manner that the animal's viscera will not be reached.

The embodiment shown in FIG. 4 comprises a hopper 26 with a swinging door 27 bounding access to two different compartments 28 and 29. Several pairs of disks are located at the upper part of the hopper 26, three being shown and denoted by 30, 31 and 32. The pairs of disks are mounted as shown in FIG. 6 so that the disks of each pair are symmetric with respect to the carcass, the spacing between the disks of said pairs increasing as the carcass advances.

Disks 30 preferably are metallic, disks 31 and 32 as shown in FIG. 7 preferably being made of a plastic disk 31a and comprising a sectioning part in the form of a metal crown 31b concentric with plastic 31a but leaving a narrow plastic strip 31c at the disk periphery, (while in a variation not shown in the drawings), disks 31, 32 may be metallic and cutting and comprise a crown made of a deforming material larger in diameter than the metal disk and fastened to the latter's periphery.

Whenever disks 31, 32 with a cutting part thus protected by a guard-crown of elastic material are so arrayed that their cutting part is facing the carcass, the guard-crown is interposed between the viscera and the cutting part. Guiding rollers 33 may also be mounted at the top of hopper 26. The noncutting metal disks 30 separate the ventral skin from the carcass and from the breast opened by the rotary cutting disk 24 when the carcass arrives essentially horizontally above the hopper. The purpose of disks 31 and 32 is to sever the tissues still retaining the animal's viscera. These tissues are of small dimensions and flatten the peripheries of disks 31 and 32 to come into contact with the cutting surfaces.

Therefore, when the carcass advances in the direction of arrow A, and is exposed to the successive actions of disks 30, 31 and 32, gravity will ensure removal of the animal's abdominal viscera, that is, in particular of the bladder and the intestines, as indicated by the bracket B in FIG. 4, the viscera falling into compartment 29 of hopper 26. The thoracic or "red" viscera, that is in particular the heart, liver and lungs, indicated by bracket C in FIG. 4, thereafter fall into compartment 28 upon pivoting door 27 and therefore will be apart from the abdominal viscera that were removed through compartment 29.

It will be noted that in this manner and due to the process of the invention and to its implementing embodiments, fully automatic evisceration of animal carcasses for human consumption has been achieved without in any manner whatever damaging the viscera at any time in all of the operations while permitting the recovery separately of the thoracic and abdominal viscera, the whole of the operations taking place without any manual operation and in perfect sanitary conditions.

Even though the invention has been described in relation to particular methods of implementation and embodiments, it will of course be appreciated that this has been done purely by way of example and may be modified as to detail without thereby departing from the basic principles of the invention.

What is claimed is:

1. Automatic evisceration process of animal carcasses for human consumption suspended from a conveyor chain and continuously moved along a track, comprising the steps of:

positioning a rotary cutting tool in relation to the animal's anus, rotating said tool and advancing the tool to penetrate the area around the animal's anus by a pre-determined length, withdrawing said tool from the animal's anus, positioning a longitudinal sectioning device in relation to the animal's anus, and causing said device to penetrate the animal's anus by a predetermined length, severing the animal's coxal bone with said device without perforating its intestines and bladder, withdrawing said device, pivoting the carcass suspended from the conveyor chain by 90° approximately, guiding the carcass to incline it to bring its ventral side onto a cutting means and then onto successive cutting elements to successively open the carcass in order to free and remove successively in separate manner the abdominal and then the thoracic viscera.

2. Process as defined in claim 1, wherein the carcass is brought near said cutting elements in essentially a horizontal position, the viscera being removed by gravity.

3. Process defined by claim 1, wherein the carcasses are suspended from their rear feet, the spacing between said feet being kept constant.

* * * * *